Aug. 22, 1961 L. R. TOTH 2,997,057
VALVE STRUCTURE HAVING READILY REMOVABLE
PLUG AND SEAT STRUCTURES
Filed Feb. 28, 1957 3 Sheets-Sheet 3
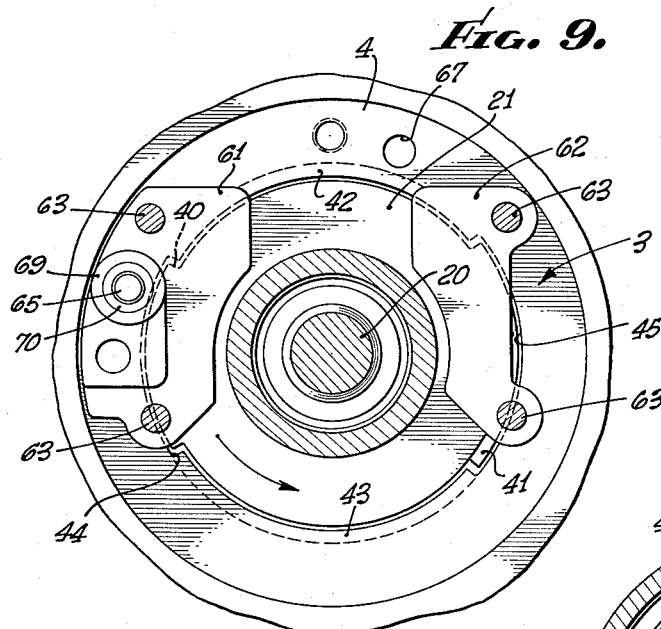
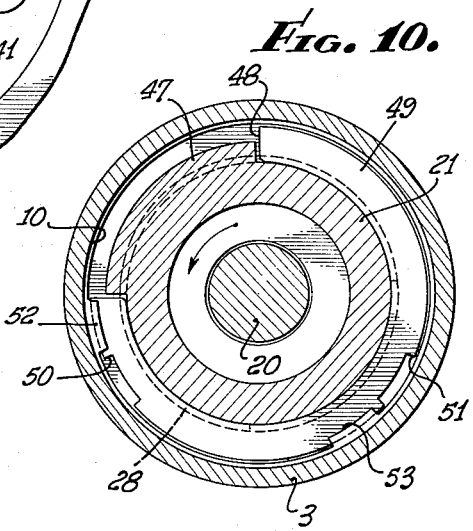
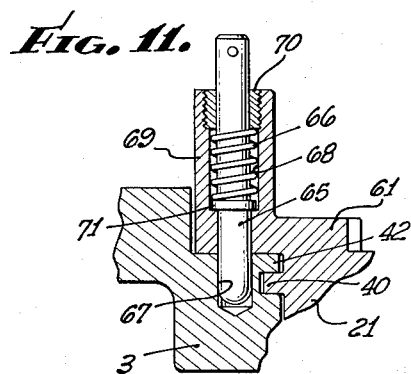
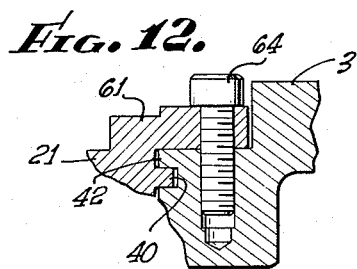
INVENTOR.
LOUIS R. TOTH,
BY
ATTORNEYS.

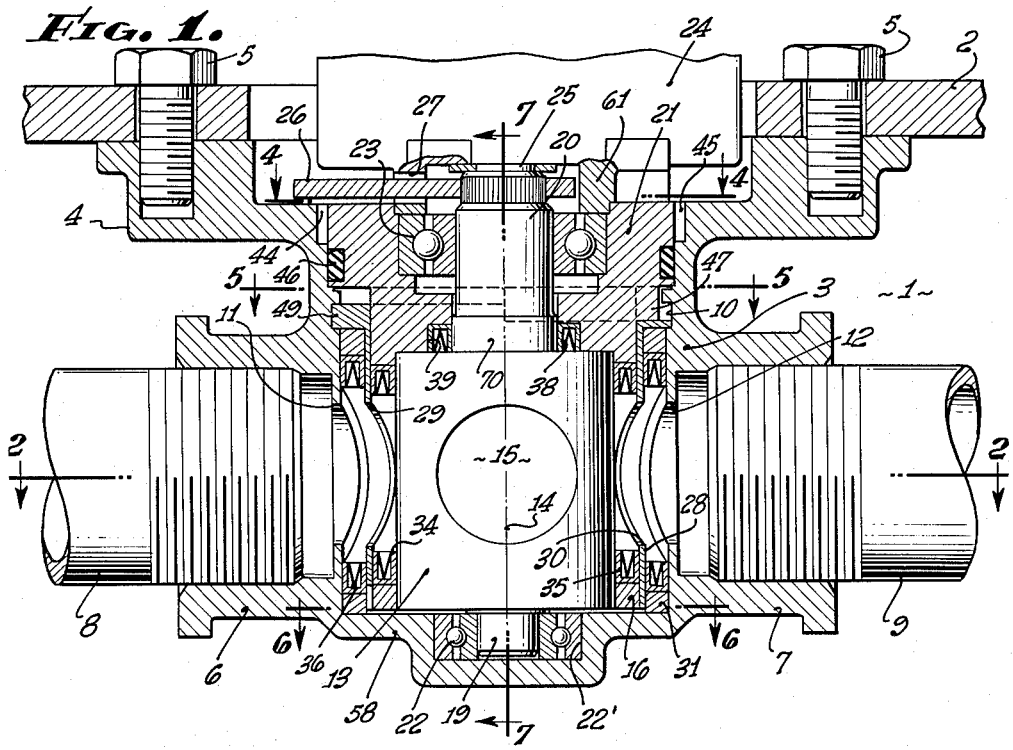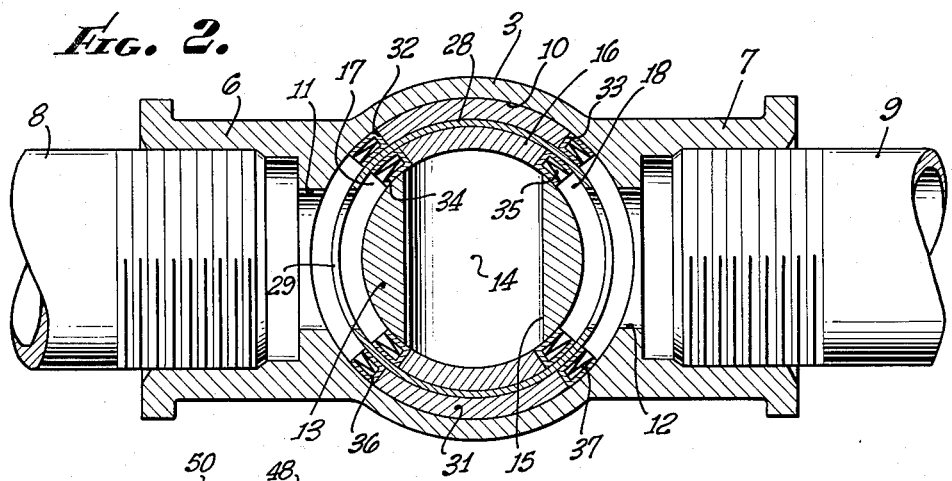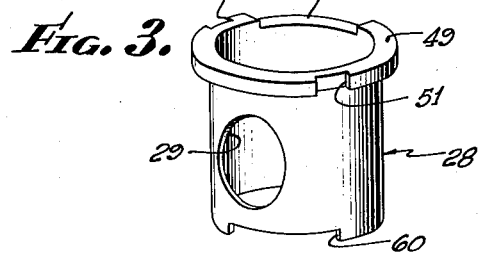

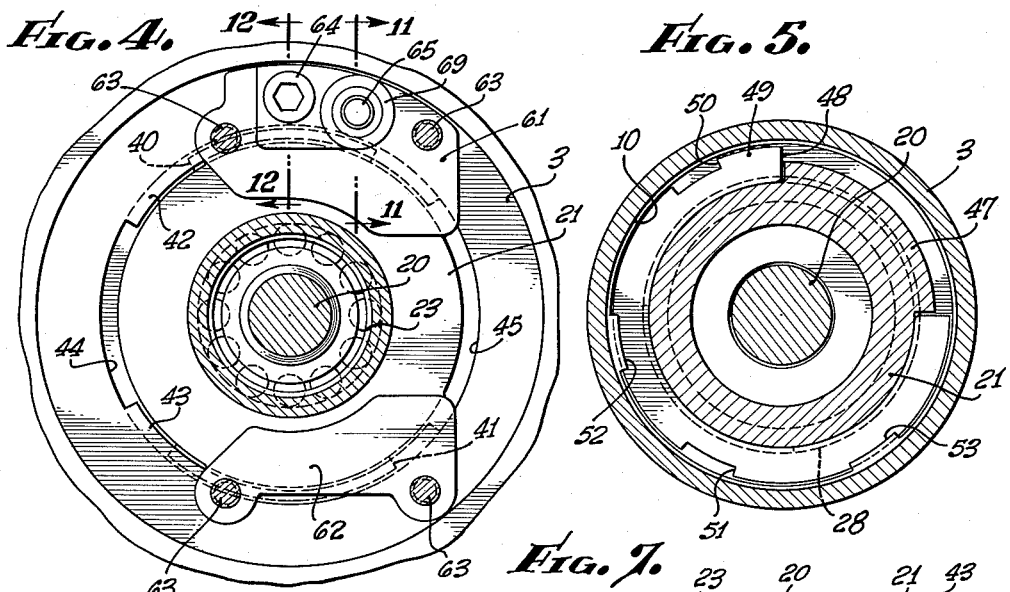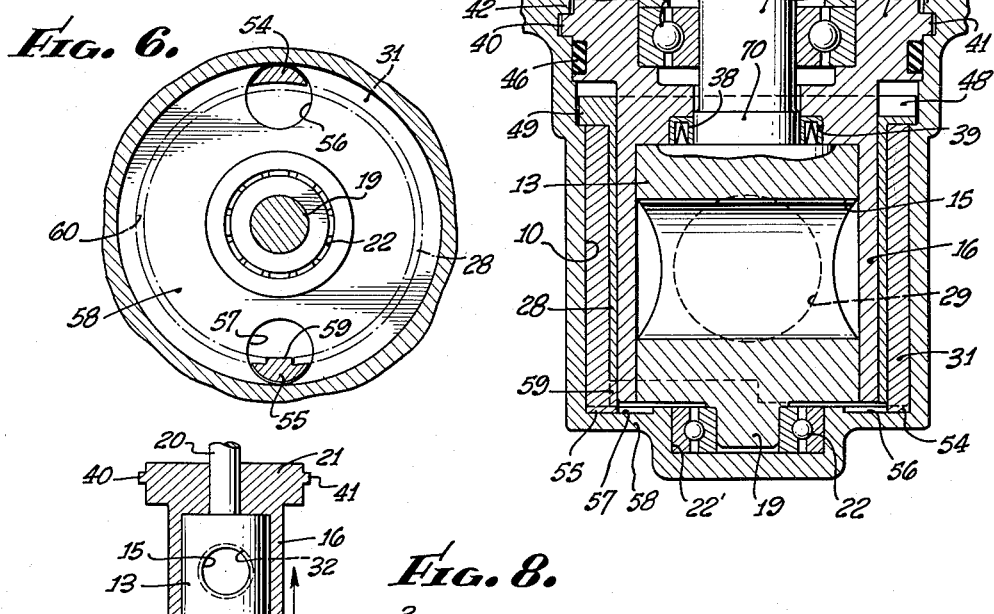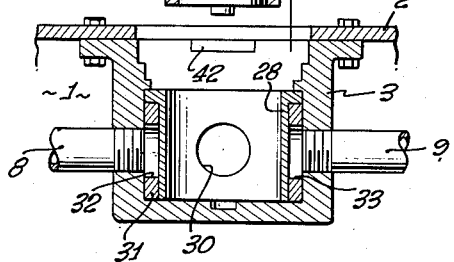

United States Patent Office 2,997,057
Patented Aug. 22, 1961

2,997,057
VALVE STRUCTURE HAVING READILY REMOVABLE PLUG AND SEAT STRUCTURES
Louis R. Toth, Montrose, Calif., assignor to General Controls Co., Glendale, Calif., a corporation of California
Filed Feb. 28, 1957, Ser. No. 643,070
8 Claims. (Cl. 137—315)

This invention relates to valves, and particularly to valve structures that require frequent inspection to determine their operability.

As an example, valves for use in connection with aircraft may be mentioned. In most instances, fuel for the aircraft engines are distributed in a number of tanks, judiciously disposed in the body structure. It is often necessary to transfer fuel from one tank to another, especially when fuel from a tank is being consumed.

Valves controlling the passage of fuel from one tank to another are required by regulations to be periodically inspected. Such inspection, when effected in connection with known valve structures, required emptying of the tanks involved, and at least a laborious partial disassembly of the valve.

It is one of the objects of this invention to obviate such disassembly and to make it possible to remove the valve seat and its cooperating closure without removing the entire valve or draining the tanks.

Although not limited to any specific type of valve, the present invention is exemplified by a plug valve having a rotary plug closure operating in a cooperating seat. It is another object of this invention to provide a seat and plug that are readily removed, but only when a supplemental closure is in closed position.

It is another object of this invention to provide a supplemental closure for the valve structure that is automatically placed in closed position when the valve seat and the cooperating closure are in condition to be removed from the body of the valve.

Due to such precautions, undesired flow through the valve is prevented during the process of inspection. Accordingly, it is still another object of this invention to make it possible to inspect the working parts of a valve while ensuring that the removal of the inspected parts will not interfere with the closing function of the valve.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a sectional view of a valve structure incorporating the invention, and shown as installed in a fuel tank or the like;

FIG. 2 is a sectional view, taken along a plane corresponding to line 2—2 of FIG. 1;

FIG. 3 is a pictorial view of a supplemental closure utilized in connection with the valve;

FIGS. 4, 5, 6 and 7 are sectional views taken along correspondingly numbered lines of FIG. 1;

FIG. 8 is a diagrammatic view illustrating the main features of the valve structure;

FIG. 9 is a view similar to FIG. 4, but in an alternative position in which it is possible to remove the seat and its associated parts;

FIG. 10 is a view similar to FIG. 5, the parts being shown in an alternative position permitting removal of the valve seat and its associated parts; and FIGS. 11 and 12 are fragmentary sectional views taken along planes corresponding to lines 11—11 and 12—12 of FIG. 4.

In the embodiment herein illustrated, the valve structure is shown as located in a space 1 (FIG. 1) defined by a wall structure 2.

The valve structure has a body 3 provided with a flange 4, by the aid of which it may be attached to the wall 2. For this purpose, a series of machine screws 5 extending around the flange 4 may be provided.

The valve body 3 has, in this instance, oppositely directed internally threaded extensions 6 and 7, accommodating conduits 8 and 9. Either of the conduits 8 or 9 may constitute an inlet or outlet to the valve. Ports 11 and 12 in body 3 lead from these conduits to the interior of the valve body.

As shown most clearly in FIG. 2, the valve body 3 includes a cylindrical interior surface 10 for the accommodation of a series of annularly arranged valving elements, hereinafter described in detail. This surface defines a circular chamber.

To control the flow of fluid between the ports 11 and 12, a plug structure 13 is mounted for angular movement about the axis 14 of the cylindrical surface 10. This plug structure has a through port 15. In the position shown in FIGS. 1 and 2, this through port is transverse to the ports 11 and 12, and accordingly the valve is closed.

The plug 13 cooperates with a valve seat 16. This valve seat 16 is annular. Its inner cylindrical seating surface accommodates the plug 13 so that plug 13 may move angularly with respect to this seat. The seat 16 is provided with diametrically opposite ports 17 and 18. When the seat 16 is in operative or active position, these ports 17 and 18 are aligned with the ports 11 and 12.

The plug 13 is rotatably supported within seat 16 by the aid of a stub shaft 19 (FIGS. 1, 6 and 7) which is provided at the lower end of the plug 13. A stem 20 extends upwardly through the upper flange 21 formed integrally with the seat 16. Ball bearing structures 22 and 23 rotatably mount shaft 19 and stem 20. Structure 22 can be readily removed in its entirety from body 3, by providing a clearance fit between the outer race and the bore 22' formed in the body for the reception of the bearing 22.

The plug 13 may be operated either manually or by a motor. In the present instance, an electric motor 24 is utilized, coupled as by the aid of a shaft 25 to the stem 20. The stem 20 also carries an arm 26 extending through an arcuate slot 27 limiting rotation of the plug 13 to 90°. This arcuate slot is formed in the franme of the motor 24.

Flange 21 of the annular seat 16 serves as a convenient support for the motor 24. For this purpose it is made quite sturdy, and seat 16 is provided with integral mounting brackets 61 and 62 (FIGS. 1, 4 and 9) accommodating the mounting screws or bolts 63.

Surrounding the annular seat member 16 is a sleeve-like supplemental closure 28. FIG. 3 illustrates the general configuration of this element. It is provided with oppositely directed ports 29 and 30. This supplemental closure 28 is arranged to be rotated to closed position when the seat 16 is so positioned that it may be removed from the valve structure.

Surrounding the supplemental closure 28 is another sleeve-like element 31. This sleeve-like element is restrained against angular movement and serves to define an annular space with the seat 16 for the accommodation of the supplemental closure 28. This sleeve 31 has diametrically opposite openings 32 and 33 aligned with the ports 11 and 12.

Means are provided to ensure seals against leakage when the plug 13 is in the closed position shown, as well as when the plug 13 is removed along with seat 16. Thus, for example, cooperating with the inner surface of the sleeve or supplemental closure 28 and around its port opening 29, there is located a seal ring 34 (FIGS. 1 and 2). This seal ring is bent to conform to the cylindrical configuration of this interior surface which is located within port 17 of seat 16. It may consist of an appropriate plastic ring of U-shaped cross-section. The plastic may be "Teflon" or equivalent material. Accommodated in the interior channel formed by the ring are appropriate metallic elements urging the legs of the U apart so that they are in sealing contact with the corresponding interior surface of supplemental closure 28 and the exterior cylindrical surface of the plug 13. The details of the seal structure are omitted, since they are well-known.

A similar sealing ring 35 is located around the port 30 and within the seat port 18.

Two other rings 36 and 37 are disposed on the exterior of the supplemental closure 28 and on the internal cylindrical surface 10, and within the openings 32 and 33 of sleeve 31.

A similar seal structure 38 (FIG. 1) extends around the base 70 of the stem 20 and is disposed between this stem and a counterbore 39 formed in the seat 16.

The seat 16, the supplemental closure 28, and the sleeve 31 form a series of nested circular members.

The structure illustrated makes it possible to remove and replace the seat 16, together with the plug 13, for inspection, cleaning or repairs. The flange 21 of seat 16 is provided with a pair of radial projections 40 and 41 (FIGS. 4, 7 and 9). These projections are of unequal arcuate extent and, in effect, constitute an interrupted flange. These projections, when the seat 16 is in operative or active position underlie inwardly directed flanges 42 and 43 extending from the open upper end of the body 3, thus restraining the seat 16 against axial movement. These are shown to best advantage in FIGS. 4 and 9. These elements 42 and 43 form an interrupted flange defining intermediate clear arcuate spaces 44 and 45. These spaces correspond in arcuate extent and spacing with the arcuate extent of the projections 40 and 41, but are slightly larger to permit clearance when the spaces are aligned with the projections.

As shown most clearly in FIG. 9, when the seat 16 is angularly moved through 90° about the axis of the plug 13 in a counterclockwise direction from the position of FIG. 4, to align the projections 40 and 41 with the spaces 44 and 45, respectively, then the seat 16 is freed and may be withdrawn by axial movement.

Purposely the angular extent of projection 41 is made somewhat different from the angular extent of projection 40 so that the seat 16 can be assembled only in one angularly oriented position.

To assemble the seat 16 and the plug structure 13, it is necessary to drop the seat 16 into place so that the projections 40 and 41 align with the spaces 44 and 45 as shown in FIG. 9 and to rotate the seat 16 in a clockwise direction so that the inwardly directed flange members 42 and 43 overlie the projections 40 and 41. This position is indicated in FIG. 4.

An O-ring seal 46, as shown in FIGS. 1 and 7, may be provided in an appropriate groove formed in the exterior surface of the flange 21 so as to seal the seat 16 properly in place.

Movement of the flange 21 from the operative position of FIG. 4 to the position of FIG. 9 also causes movement of the supplemental closure 28 to closed position. For this purpose, the flange 21 carries a single radial projection 47 (FIGS. 5 and 10) which interfits an arcuate slot 48 (see also FIG. 3) formed in the top flange 49 of the closure member 28.

In the active position of valve seat 16, the projection 47 and the slot 48 are in the position of FIG. 5. Upon rotation of the seat 16 in a counterclockwise direction to the position of FIG. 10, the supplemental closure 28 is also rotated by 90°. Thus, the ports 29 and 30 are then out of registery with the ports 11 and 12. Accordingly, the seat 16 cannot be removed until the supplemental closure 28 is in the closed position; and it is only then that the projections 40 and 41 are in a position to be removed through the arcuate openings 44 and 45.

FIG. 8 diagrammatically illustrates the withdrawal of the valve seat 16 with the plug 13 from the body 3, leaving the supplemental closure 28 in the closing position with respect to the ports in the valve.

The periphery of flange 49 formed integrally with the supplemental closure 28 is provided with a pair of slots 50 and 51 (FIGS. 3, 5 and 10). These slots can be aligned with the inwardly directed lips or projections 52 and 53 extending inwardly from the body surface 10. When the projections are aligned with these slots, it is possible to remove the supplemental closure 28. In either position of FIG. 5 or FIG. 10, however, these projections 52 and 53 are out of alignment with the slots 50 and 51. Accordingly, the supplemental closure 28 is restrained against removal unless it is deliberately intended to do so.

The ring 31 surrounding the thin sleeve portion of the supplemental closure 28 is restrained against angular movement. For this purpose, it is provided at its lower edge with diametrically opposite crescent-shaped projections 54 and 55 (FIG. 6) These projections have arcuate outer surfaces cooperating with circular depressions or recesses 56 and 57 formed in the bottom wall 58 of the body 3. These recesses are also indicated in FIG. 7. One of these projections 55 has a radially inwardly directed extension 59 serving as a stop or limit to the rotation of the supplemental closure 28. For this purpose, the lower edge of the supplemental closure 28 is provided with a slot 60 into which the radial extension 59 extends. The end of this slot limit motion of the closure 28 to 90°. The movement of the seat is also limited by this means.

Bracket 61 makes provision for the accommodation of a fastening means to hold the valve seat 16 in operative position. For this purpose, a machine screw 64 (FIGS. 4 and 12) may be provided. This machine screw passes through the bracket 61 and is threaded into an appropriate aperture in the flange 4 of body 3. This machine screw must first be removed before the valve seat 16 can be angularly moved to place it in position for removal.

In order to safeguard against inadvertent omission of the fastening means 64, an indexing pin 65 is also provided (FIGS. 4, 9 and 11). This pin is urged by a compression spring 66 into an appropriate indexing aperture 67 formed in the flange 4. A compression spring 66 is accommodated in a counterbore 68 in a boss 69 formed integrally with the bracket 61. The spring 66 is restrained by a sleeve 70 extending around the pin 65 and threaded into the upper end of the boss 69. A collar 71 formed on the pin 65 serves to limit the inward movement of the indexing pin 66, as well as to accommodate the lower end of the spring 68.

Accordingly, in order to free the closure 16 for removal as hereinabove described, it is necessary as well to pull the indexing pin 65 out of engagement with the aperture 67.

In the process of reassembling the seat 16, the indexing pin 65 automatically engages the aperture 67 as soon as the valve seat 16 assumes its operative position.

The inventor claims:

1. In a valve structure: a valve body having ports; a removable valve seat having ports normally registering with the body ports and also having a radial projection; the body having an overhanging interrupted flange under which the projection can move; said flange restraining movement of the seat out of the body except when the projection registers with an interruption in the flange; and a supplemental closure surrounding the seat and coupled to the seat so as to be moved by the seat to closed position when the projection registers with the interruption.

2. In a valve structure: a valve body having ports; a removable valve seat having ports normally registering with the body ports and also having a radial projection; the body having an overhanging interrupted flange under which the projection can move; said flange restraining movement of the seat out of the body except when the projection registers with an interruption in the flange; a supplemental closure surrounding the seat and coupled to the seat so as to be moved by the seat to closed position when the projection registers with the interruption; and means carried by the body for limiting the movement of the supplemental closure between open position and closed position.

3. In a valve structure: a valve body having at least one port; a removable valve seat having a port normally registering with the body port, and angularly movable in said body about an axis, and removable in a direction corresponding to said axis; relatively movable engaging means for maintaining the valve seat in normal position; a main closure member cooperating with the seat; said closure member being angularly movable about said axis; means for restraining axial movement of said closure member during its angular movement; a supplemental closure member angularly movable to open and close the ports; and means operated by relative movement of the relatively movable means, for moving said supplemental closure member to closed position.

4. In a valve structure: a valve body having at least one port; a removable valve seat located in the body about an axis, and removable in a direction corresponding to said axis; said valve seat and the body having cooperating parts, for maintaining said seat in normal operative position, said cooperating parts being disengaged to permit removal of said seat; said seat having a port registering with the body port; a main closure member cooperating with the seat and angularly movable to cover and uncover the port in the seat; said closure member being angularly movable about said axis; means for restraining axial movement of said closure member during its angular movement; a supplemental closure member interposed between the body and the seat and angularly movable to closed position; and means operated by movement of the said cooperating parts to disengageable position for moving said supplemental closure member to its closed position.

5. In a valve structure: a valve body having at least one port; a valve seat; said seat having a port registrable with the body port; said seat having an axis of rotation, and removable from the body by movement in an axial direction, and angularly movable about said axis between a first position and a second position; said first position corresponding to port registration, and the second position corresponding to complete closing of the ports; a plug closure having a port, and rotatable in said seat; said closure being angularly adjustable to cause the port to be aligned with the body port; means restraining said seat against axial movement out of the body, and placed in restraining position upon angular movement of the seat from the second toward the first position; a rotatable supplemental closure for the body port; and means for bringing the supplemental closure to closing position by movement of the seat to said second position.

6. In a plug valve structure: a valve body having a circular chamber and a port leading to the chamber; a plug closure in the body; a series of three nested circular members in said chamber interposed between the plug closure and the body; said members defining annular spaces; the outer member defining an opening in registry with the valve body port; the intermediate member forming an angularly movable supplemental closure having a port registering with the body port; the inner nested member forming a removable valve seat having a port normally registering with the body port, and within which the plug closure is accommodated; means operable optionally to restrain and to free the seat with respect to the body; and means moved by operation of said restraining and freeing means to freeing position, for angularly moving the supplemental closure to port-closing position.

7. In a plug valve structure: a valve body having a circular chamber and a port leading to the chamber; a plug closure in the body; a series of three nested circular members in said chamber interposed between the plug closure and the body; said members defining annular spaces; the outer member defining an opening in registry with the valve body port; the intermediate member forming an angularly movable supplemental closure having a port registering with the body port; the inner nested member forming a removable valve seat having a port normally registering with the body port, and within which the plug closure is accommodated; an interrupted flange carried by the body; a projection carried by the seat and in contact with the interrupted flange to hold the seat in restrained position, said seat being angularly movable to free the projection from the flange.

8. In a plug valve structure: a valve body having a circular chamber and a port leading to the chamber; a plug closure in the body; a series of three nested circular members in said chamber interposed between the plug closure and the body; said members defining annular spaces; the outer member defining an opening in registry with the valve body port; the intermediate member forming an angularly movable supplemental closure having a port registering with the body port; the inner nested member forming a removable valve seat having a port normally registering with the body port, and within which the plug closure is accommodated; an interrupted flange carried by the body; a projection carried by the seat and in contact with the interrupted flange to hold the seat in restrained position, said seat being angularly movable to free the projection from the flange; and a connection between the seat and the supplemental closure to move the supplemental closure to closing position upon movement of the seat to freeing position.

References Cited in the file of this patent

UNITED STATES PATENTS

| | | |
|---|---|---|
| 719,528 | Stevens | Feb. 3, 1903 |
| 851,338 | Barnhouse | Apr. 23, 1907 |
| 1,019,590 | Beck | Mar. 5, 1912 |
| 1,086,221 | Reynolds | Feb. 3, 1914 |
| 1,226,175 | Bibleheiser | May 15, 1917 |
| 2,230,434 | Porter | Feb. 4, 1941 |

FOREIGN PATENTS

| | | |
|---|---|---|
| 1,213 | Great Britain | of 1892 |
| 370,700 | Germany | Mar. 6, 1923 |
| 691,430 | Great Britain | of 1953 |